No. 767,360. PATENTED AUG. 9, 1904.
J. W. STEPHENSON.
CAR AXLE BOX.
APPLICATION FILED DEC. 6, 1902. RENEWED MAR. 1, 1904.
NO MODEL. 3 SHEETS—SHEET 1.
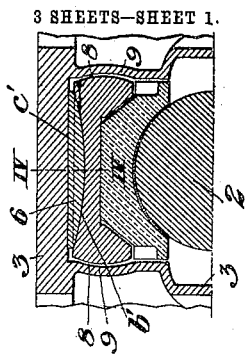
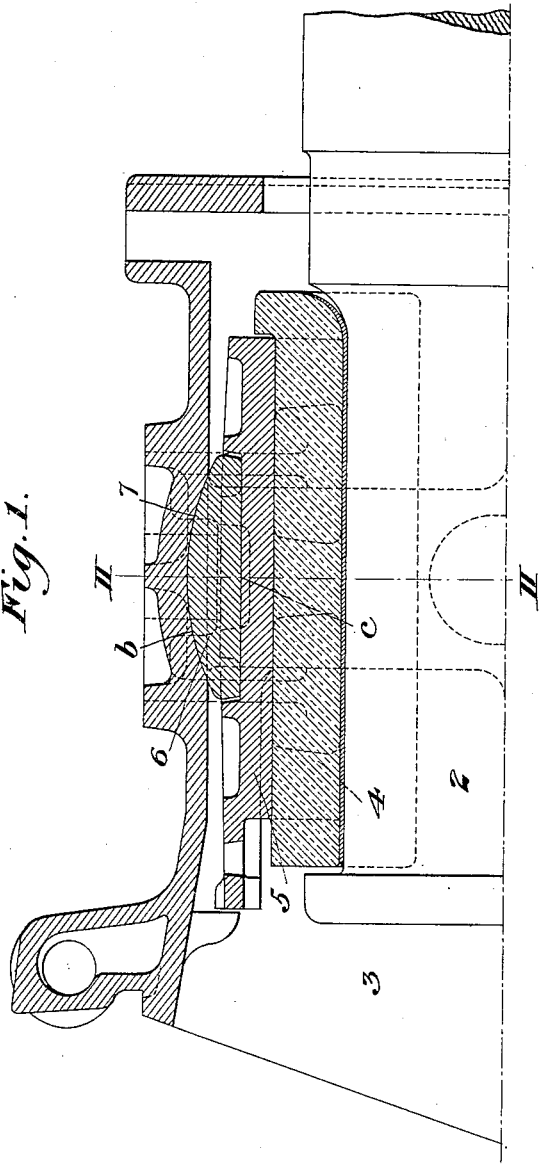
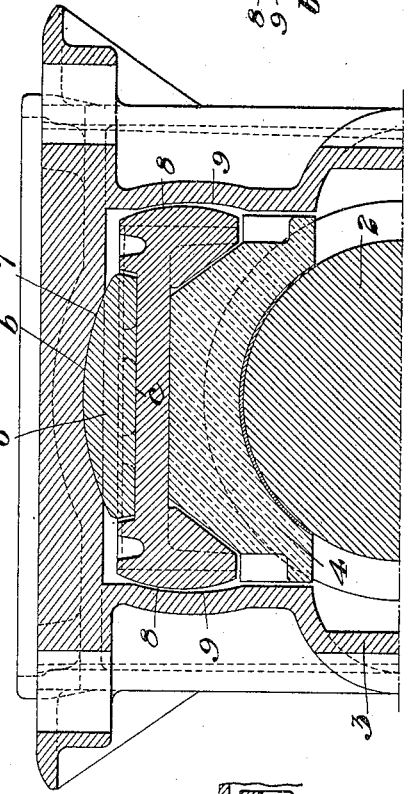
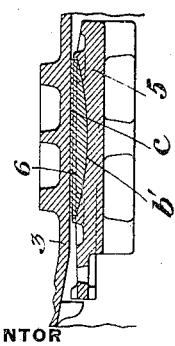
WITNESSES
INVENTOR
John W. Stephenson

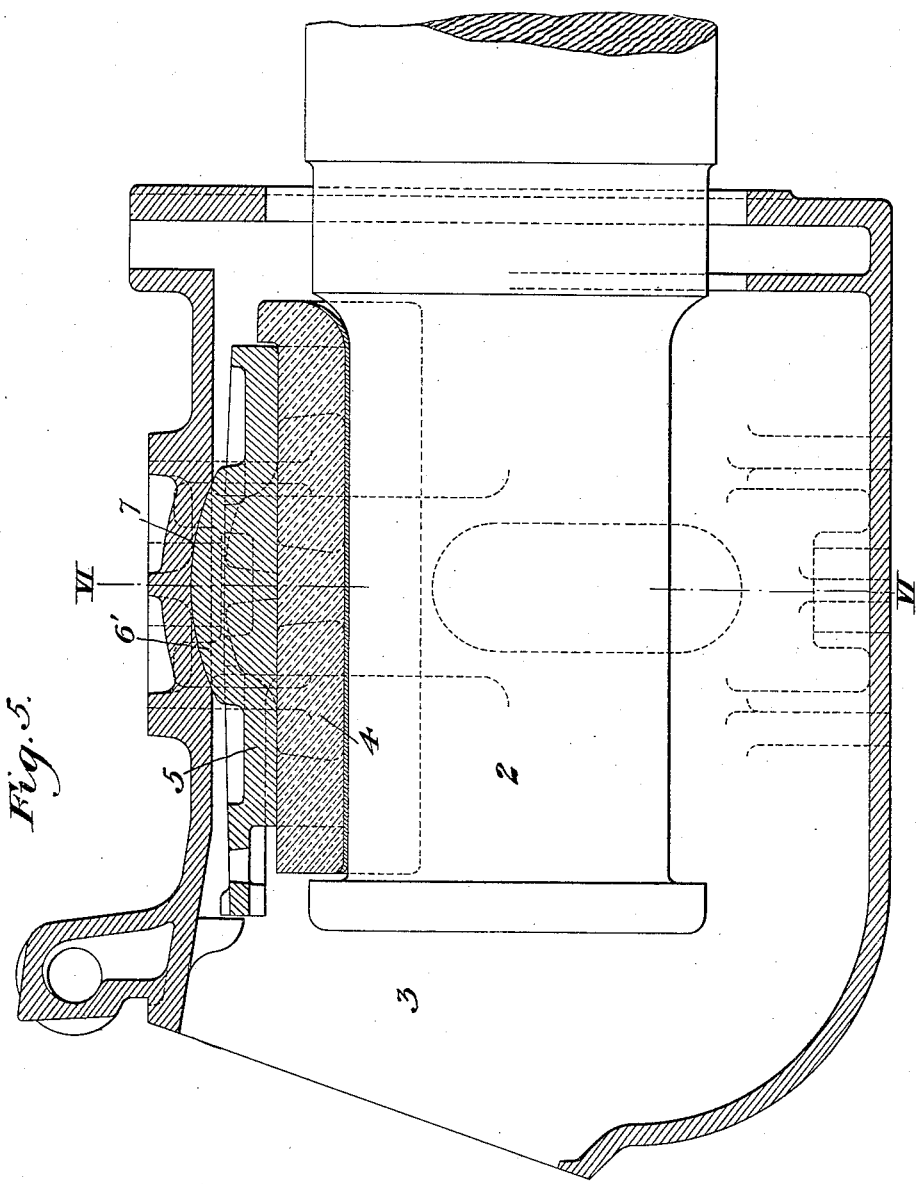

No. 767,360. PATENTED AUG. 9, 1904.
W. STEPHENSON.
CAR AXLE BOX.
APPLICATION FILED DEC. 6, 1902. RENEWED MAR. 1, 1904.
NO MODEL. 3 SHEETS—SHEET 3.
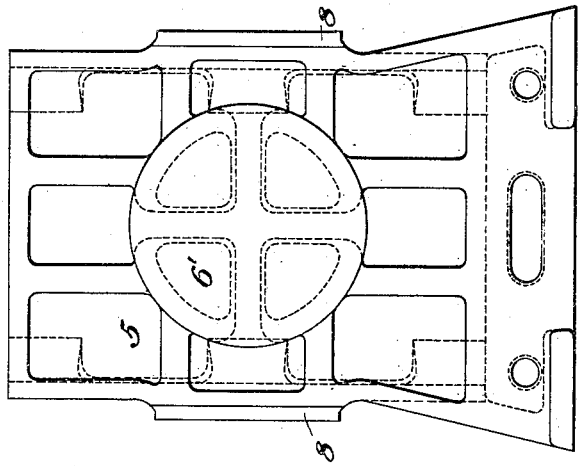
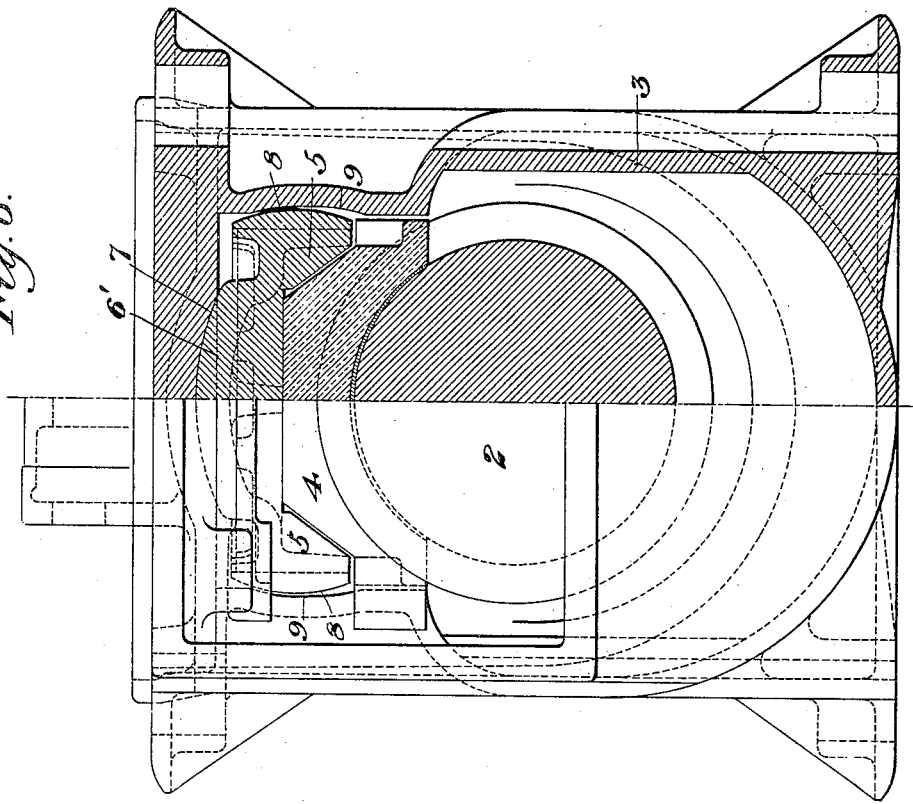

No. 767,360. Patented August 9, 1904.

UNITED STATES PATENT OFFICE.

JOHN W. STEPHENSON, OF TOLEDO, OHIO, ASSIGNOR TO THE NATIONAL MALLEABLE CASTINGS COMPANY, A CORPORATION OF OHIO.

CAR-AXLE BOX.

SPECIFICATION forming part of Letters Patent No. 767,360, dated August 9, 1904.

Application filed December 6, 1902. Renewed March 1, 1904. Serial No. 196,101. (No model.)

*To all whom it may concern:*

Be it known that I, JOHN W. STEPHENSON, of Toledo, Lucas county, Ohio, have invented a new and useful Car-Axle Box, of which the following is a full, clear, and exact description, reference being had to the accompanying drawings, forming part of this specification, in which—

Figure 1 is a longitudinal section of the upper half of an axle-box constructed in accordance with my invention. Fig. 2 is a vertical cross-section on the line II II of Fig. 1. Fig. 3 is a view, on a smaller scale, similar to Fig. 2, showing a modification. Fig. 4 is a longitudinal section of the wedge and a portion of the box on the line IV IV of Fig. 3. Fig. 5 is a vertical longitudinal section on the same scale as Fig. 1, showing a modified construction. Fig. 6 is an end view showing half the box in cross-section on the line VI VI of Fig. 5. Fig. 7 is a top plan view of the wedge shown in Figs. 5 and 6.

My invention is an improvement on the axle-box construction claimed in Letters Patent No. 692,086, granted to me on January 28, 1902. In that patent I claimed the combination of a journal-box, a wedge, one of which parts has a projection bearing upon the other and constituting a universal rocking bearing, and a journal-brass.

My present invention has for its purpose to improve the rocking and self-adjusting action of the wedge; and it consists in forming the sides of the wedge adjacent to the box rounded in a vertical direction, either concave or convex, and the meeting sides of the box in counterpart therewith. Entire freedom of adjustment of the wedge is thus afforded. Vertical bearing of the load upon the center of the car-axle is maintained, and the binding of the bearings upon the journals and uneven wear and heating of the parts are prevented.

It also consists in making the rocking bearing between the wedge and the box of a separate piece interposed between the top of the box and the wedge and bearing directly on the wedge rounded on one side and having a sliding bearing on the other side. This affords not only a rocking adjustment, but also a sliding adjustment sufficient to prevent grinding or uneven wear on the rounded bearing-surfaces.

As stated in the specification of my said patent, 2 represents the axle of a car.

3 is the journal-box.

4 is the brass or journal-bearing, which may be of ordinary construction, and 5 is the wedge which is interposed between the top of the box and the brass. This wedge instead of having a flat bearing against the box, as heretofore, has a universal rocking bearing constituted by a convex protuberance 6 on the wedge fitting a concave seat 7 on the box, or the convexity may be on the box and the concavity on the wedge. If now the wedge should fit the box or the brass unevenly, instead of causing the brass to bind upon the journal of the axle the wedge will adjust itself on the rocking bearing constituted as just described, so as to produce accurate parallelism between the brass and the journal, and thus transmit the load to the axle centrally and prevent heating and wear. The sides of the wedge adjacent to the sides of the journal-box are convex in a vertical direction, as at 8, and the adjacent surfaces of the box are concave, as at 9, so that straight surfaces at these places being dispensed with the friction is reduced to a minimum and the wedge will readily adjust itself. If desired, the concavities may be on the wedge and the convexities on the sides of the box, and other modifications may be made by the skilled mechanic. The protuberance 6, as shown in Figs. 1, 2, 3, and 4, is constituted by a separate piece, which in Figs. 1 and 2 has on its top a rounded surface $b$, bearing against a counterpart surface on the under side of the top of the box and on the under side is flat and bears on a flat seat $c$ on top of the wedge, which seat is somewhat larger than the piece 6, so that the latter may slide thereon preferably in every direction, and may thus prevent the tendency of the rounded bearing-surfaces to shift or become worn unevenly by grinding. In Figs. 3 and 4 I show the rounded bearing $b'$ on the under side of the piece 6 and the flat bearing $c'$ on the upper side. In either case the effect is the same.

The location of the piece 6 directly between the wedge and the under surface of the top of the box is important, because it is thus removed as far as possible from the axle and its efficiency as a rocking bearing is greatly increased.

In Figs. 5, 6, and 7 the protuberance 6' is integral with the wedge, and the advantages of the sliding bearing c', last mentioned, are not obtained.

I claim—

1. In a journal-box a wedge having vertically-rocking bearings between the sides of the wedge and the sides of the box; substantially as described.

2. In a journal-box, a wedge having vertically-rocking bearings between the sides of the wedge and the sides of the box, and a rocking bearing between the top of the wedge and the box; substantially as described.

3. In a journal-box, a wedge having vertically-rocking bearings between the sides of the wedge and the sides of the box, and a universal rocking bearing between the top of the wedge and the box, said latter bearing being constituted by a separate piece rounded on one side and having a sliding face on the other side; substantially as described.

In testimony whereof I have hereunto set my hand November 28, 1902.

JOHN W. STEPHENSON.

Witnesses:
J. W. LANE,
J. W. LYONS.